Figure 1:
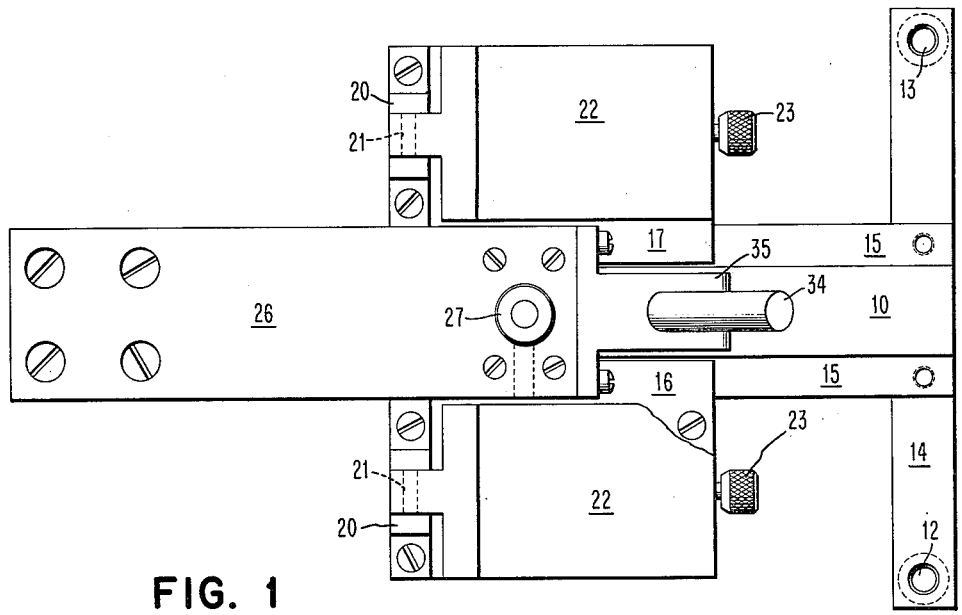

May 7, 1963 W. E. SEMPLE 3,088,211
DEVICE FOR MEASURING FIBER AND COATING HEIGHT
Filed Dec. 8, 1961 2 Sheets-Sheet 1

INVENTOR
WILLIAM E. SEMPLE
BY G. R. Gugger
AGENT

United States Patent Office 3,088,211
Patented May 7, 1963

3,088,211
DEVICE FOR MEASURING FIBER AND
COATING HEIGHT
William E. Semple, Endicott, N.Y., assignor to International Business Machines Corporation, New York, N.Y., a corporation of New York
Filed Dec. 8, 1961, Ser. No. 157,909
10 Claims. (Cl. 33—167)

This invention relates to a device for measuring the height of fibers and coatings and more particularly to a device for measuring paper fibers projecting from the edges of a perforation in a statistical record card.

Record cards having control perforations disposed at various index positions to represent data and the various types of accounting machines which are controlled by such cards are well known and have been in use for some time. Over the years, the use of such record controlled machines has substantially increased to the point where today the machines are subjected to almost constant usage which involves the processing of a tremendous volume of record cards. To meet the demand of business, record controlled machines are constantly being improved to have greater capacity and to operate at higher speeds and this has reactivated the problems of unduly high burrs on the cards and of harmful card dust accumulation in the machines. Unduly high burrs or fibers on the cards will seriously hinder the operation of card feeding components on the machines, such as the picker knives, because the cards will not stack properly in the feed hopper and also they will result in harmful card dust accumulation in the electrical units, such as the sensing brushes.

Burrs on the cards are caused when the mechanical punch elements in the card punching machines become dull due to excessive wear. A sharp punch will clearly cut a hole which will have sharp edges but a dull punch will produce a fuzzy hole having card fibers protruding from its edges and as the punches become more dull, higher and more critical fibers will protrude. The average acceptable life of a punch element of the type used in card perforating machines can vary, say from 1.5 million to 64 million operations, depending on many factors such as speed of operation, type of paper, whether the paper is coated or inked, and the like. And a need has long been felt in the industry for a satisfactory and accurate method of testing the quality of the perforations being made in record cards by the punching machines whereby it may be accurately determined when punching elements have reached a point of wear where they should be replaced. Up until now, such testing was carried out by what may be termed as opinion surveys. Engineers who service the record card punching machines in the field would, from time to time, take a sample group of 10 perforated record cards, stack them and look through a row of aligned perforations. If the resulting hole appeared to the observer to be unduly fuzzy then it was considered time to replace the corresponding punch element. Obviously such a method varied considerably and it was impossible to set up any standard.

The present testing device dispenses with any guess work and establishes a standard specification for the replacement of punches. In the preferred embodiment of the device, the perforated card to be tested is clamped onto a horizontally slideable platform. A stylus of "Porelon" plastic which is the trademark of S. C. Johnson & Co., Inc., for a micro-porous, micro-recticulated plastic composition made under U.S. Patent 2,777,824, impregnated with a colored dye, as methyl-violet in a solution of glycol, or other, is brought into contact with a card fiber. Upon contact, the capillary action of the fiber, acting as a wick, absorbs the colored dye. This fiber coloration, readily observed through a microscope attached to the device, indicates non-destructive contact of the stylus with the fiber. Fiber height is read from a micrometer head used to position the stylus. In use, the stylus is calibrated on the normal unperforated surface of the paper and fiber height is read as the difference between zero set on the paper and the dimension at which coloration of fiber takes place. In this manner, a standard of .004 of an inch has been established for the industry and punches which leave fibers which exceed .004 in height are deemed to be too dull for further use and are replaced.

It should be pointed out that the use of the present device is not limited to the measurement of paper fibers. It may be used in connection with fibers on plastic devices, such as plastic record cards, addressing stencils, and the like. In addition, it may be used to determine the height of the magnetic material deposited on magnetic tapes and drums for the purpose of determining the required clearance for read-write heads. Also, in the field of metallurgy, the present device may be advantageously used to measure the height of metal fibers when making analytic studies regarding stress and strain of metals and the purity of metals.

Accordingly, a principal object of the present invention is to provide an improved measuring device for determining the height of projecting fibers and coatings on the surface of various materials.

A further object of the present invention is to provide an improved measuring device for determining when perforations in record cards have been made by dull punching elements.

A further object of the present invention is to provide an improved measuring device for determining the height of paper fibers projecting from the edges of perforations in a record card.

A still further object of the present invention is to provide a measuring device capable of determining the height of minute paper textile, wood, plastic, or metal fibers without destroying or crushing the fibers.

The foregoing and other objects, features and advantages of the invention will be apparent from the following more particular description of a preferred embodiment of the invention, as illustrated in the accompanying drawings.

Figure 2:
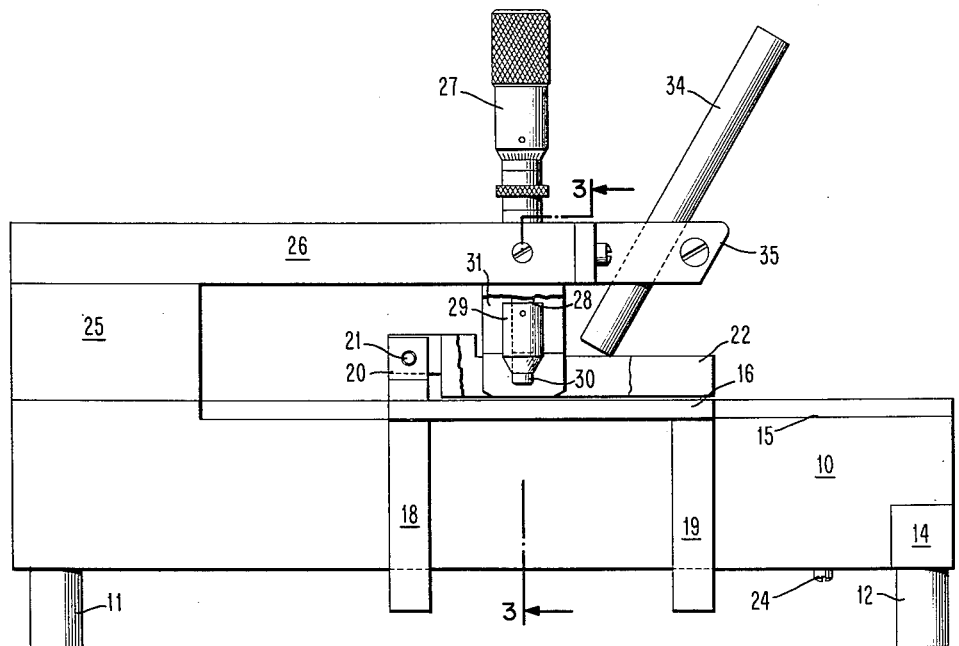
Figure 3:
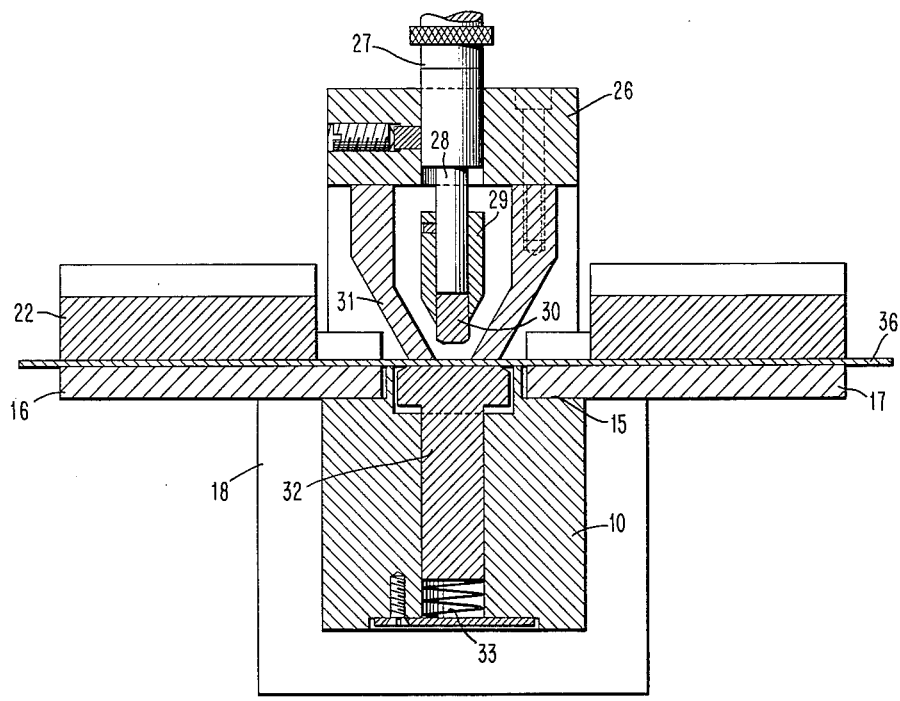
Figure 4:
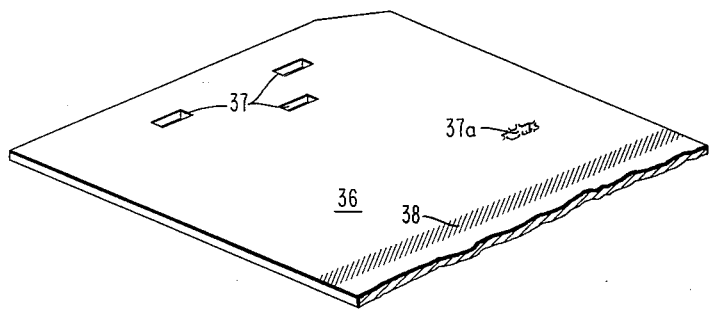

In the drawings:
FIG. 1 is a plan view of the measuring device.
FIG. 2 is a side elevation of the device shown in FIG. 1.
FIG. 3 is a sectional view taken along the line 3—3 of FIG. 2.
FIG. 4 is a perspective view showing a portion of a typical perforated record card having vertically projecting paper fibers of the type which are measured by the present device.

Referring to FIGS. 1 and 2, the measuring device comprises a main base or support block 10 which is supported at the back end on a stud 11 and at the front end by a pair of studs 12 and 13 fastened to a crossbar 14 which in turn is bolted to the main block 10. A pair of grooves 15 are formed in the top surface of the main block and these grooves serve as guide channels for a movable card carriage unit.

The card carriage unit comprises a pair of bed plates 16 and 17 positioned in the guide channels 15. The bed plates are fastened together by a pair of U-shaped guide brackets 18 and 19 which slidably encompass the main block 10 such that the card carriage unit may be slidably moved back and forth along the guide channels 15. The bed plates function to carry the record card to be tested and in order to retain the card in place, each bed plate has affixed along its back edge a bracket member 20 to which is pivotally mounted, by means of a hinge pin 21, a relatively heavy card clamp plate 22. A knurled knob 23 is affixed to the front end of each clamp plate to facilitate opening and closing of the plates.

A stop screw 24 attached to the underside of the main block 10 serves to limit the forward travel of the carriage unit and the backward travel of the unit is limited by the abutment of the bed plates 16, 17 against a spacer block 25 attached at the back end of the main block.

The spacer block 25 serves to support a rectangular mounting bar 26 in position over the card runway provided by the top surface of the main block. As shown in FIGS. 2 and 3, a suitable micrometer 27 is mounted in the bar 26 and attached to the movable shaft 28 of the micrometer, by means of a collar 29, is a stylus 30 of "Porelon" plastic which has been impregnated with a colored dye, as methyl-violet in a solution of glycol, or the like. Attached to the underside of the mounting bar 26 are a pair of shield members 31 which extend down along opposite sides of the micrometer shaft and stylus.

Mounted in the main block 10 and in axial alignment with the stylus is a circular plunger-type member 32, as shown in FIG. 3. The plunger 32 is urged upwardly by means of a coil back-up spring 33 and normally bears against the bottom edges of the two shield members 31. The plunger and shield members, in effect, provide a yieldable throat through which the card to be tested is inserted and they serve to maintain as flat and taut as possible that portion of the card that rides directly beneath the stylus. To facilitate obtaining the fine degree of measurement that is required, a microscope member 34 is provided which is aimed at the testing area beneath the dye impregnated stylus. The microscope 34 is slideably mounted in a mounting plate 35 attached to the front end of the bar 26 to facilitate focussing by the operator.

In FIG. 4, there is shown a portion of a typical record card 36 having the perforations 37 disposed at various index point positions to represent statistical data. One of the perforations, designated 37a, is shown as having an undue amount of fibers projecting from its edges, as would be the case if it were cut by a dull punch element. To accurately measure the height of the fibers, the carriage unit is moved to the front end of the device and the record card is first positioned on the bed plates 16, 17 so that the micrometer may be calibrated against the unperforated portion of the card. The clamping plates 22 are closed and the carriage unit and record card are moved back and forth underneath the stylus 30. While peering through the microscope, the micrometer is adjusted until the first trace of colored dye from the stylus appears on unperforated portion of the surface of the moving card, at which point the micrometer is calibrated at a "zero setting." After calibration, the micrometer is backed off and the record card is repositioned in the carriage unit so that a selected perforation or row of perforations will pass in the path directly beneath the dye impregnated stylus. The card can be easily adjusted laterally in either direction while it is frictionally retained on the carriage unit by the clamping plates. The carriage and card are again moved back and forth and the micrometer adjusted until the stylus is brought in contact with projecting fibers of the selected perforation. Upon minimum contact, the capillary action of the fiber, acting as a wick, absorbs the colored dye. This fiber coloration is readily observed through the microscope and indicates stylus contact with the fiber without actually destroying the fiber. Fiber height is read directly from the micrometer head used to position the stylus and is read as the difference between the "zero set" on the card and the dimension at which coloration of fiber takes place. Although not shown, a suitable lamp may be attached to the device to aid in observing when the first trace of color appears on the fibers.

The indicator accuracy of the present device is in the order of plus or minus .001, resulting in a very accurate test which can be used to determine the wear of punching elements. As was previously mentioned, punches which leave fibers which exceed .004 of an inch in height are deemed to be too dull for further use and are replaced.

It may be pointed out that it is not necessary to calibrate the micrometer for each card tested. For example, where the record cards are made from the card stock of a single manufacturer and the card stock is known to have a certain standard of thickness, such as .007 plus or minus .0005, then one zero setting of the micrometer will suffice for the subsequent fiber measurement of all record cards made from like card stock.

As was previously mentioned, the present device may be used to measure the height of fibers projecting from textile, plastic, wood or metal materials, as well as paper fibers. In addition, as was pointed out, it may be advantageously used to determine the height of coatings deposited on the surface of materials. For example, the device may be operated in the manner described above to determine the height of the strip of magnetic coating 38 on the record card shown in FIG. 4. The measurement of the height of magnetic coating deposited on record cards, tapes and drums enable more accurate clearance calculations to be made for the read-write heads which are employed with storage mediums of this kind.

While the invention has been particularly shown and described with reference to a preferred embodiment thereof, it will be understood by those skilled in the art that various changes in form and details may be made therein without departing from the spirit and scope of the invention.

What is claimed is:

1. In a device for measuring the height of a coating or of fibers projecting from the surface of a piece of material, a micrometer having a movable tip, means for supporting a piece of material in position to enable said micrometer to be adjusted into non-destructive contact with said coating or fibers, and a stylus impregnated with a colored dye fastened to said micrometer tip whereby colored dye is transferred to the top of the coating or fibers upon contact therewith.

2. A device for measuring the height of a coating or of fibers projecting from the surface of a piece of material as defined in claim 1 and including microscopic viewing means to facilitate observance of when the earliest contact is made between said stylus and the coating or fibers, whereupon a measurement of the height of the coating or fibers may be read from the micrometer.

3. In a device for measuring the height of fibers projecting from perforated record cards and the like, a base, a movable card carriage unit mounted on said base, means for clamping a record card on said carriage unit, a micrometer positioned above said carriage unit and record card, and a stylus impregnated with a colored dye fastened to the tip of said micrometer, said card carriage and record card being horizontally movable under said stylus and said micrometer being adjustable to move said stylus toward said record card and into non-destructive contact with fibers projecting from said card whereupon absorption by the fibers of colored dye from the stylus may be observed and a measurement of the height of the fibers read from the micrometer.

4. A device for measuring the height of fibers projecting from perforated record cards as defined in claim 3 and including adjustable microscope means positioned above said carriage unit to facilitate the observance of the earliest contact of the stylus with said projecting fibers.

5. A device for measuring the height of fibers projecting from perforated record cards as defined in claim 3 and including yieldable throat means in alignment with said stylus and through which said record card travels, said throat maintaining flat and taut that portion of the card that is in alignment with said stylus.

6. A device for measuring the height of fibers projecting from perforated record cards and the like which comprises, a micrometer having a movable tip, means for selectively positioning a perforated record card so that projecting fibers are directly underneath said micrometer tip, said micrometer being calibrated with a zero setting which corresponds to the height of the record card alone, and a stylus impregnated with a colored dye fastened to said micrometer tip whereby adjustment of said micrometer to move said stylus into non-destructive contact with said fibers will result in colored dye transferring to the top of said fibers at which point the setting of the micrometer will indicate the height of said fibers.

7. A device for measuring the height of fibers projecting from a piece of material which comprises, a micrometer having a movable tip, means for selectively positioning a piece of material so that projecting fibers are directly underneath said micrometer tip, said micrometer being calibrated with a zero setting which corresponds to the height of the material without projecting fibers, and a stylus impregnated with a colored dye fastened to said micrometer tip whereby adjustment of said micrometer to move said stylus into non-destructive contact with said fibers will result in colored dye transferring to the top of said fibers at which point the setting of the micrometer will indicate the height of said fibers.

8. In a device for measuring the height of fibers projecting from a piece of material, a base, a movable carriage unit mounted on said base, means for clamping a piece of material on said carriage unit, a micrometer positioned above said carriage unit and piece of material, and a stylus impregnated with a colored dye fastened to the tip of said micrometer, said carriage and material being horizontally movable under said stylus and said micrometer being adjustable to move said stylus toward said material and into non-destructive contact with fibers projecting therefrom whereupon contact of the fibers with colored dye from the stylus may be observed and a measurement of the height of the fibers read from the micrometer.

9. A device for measuring the height of a coating deposited on the surface of a piece of material which comprises, a micrometer having a movable tip, means for selectively positioning a piece of material so that at least a portion of the coating deposited thereon is directly underneath said micrometer tip, said micrometer being calibrated with a zero setting which corresponds to the basic height of the material without a coating, and a stylus impregnated with a colored dye fastened to said micrometer tip whereby adjustment of said micrometer to move said stylus into non-destructive contact with said coating will result in colored dye transferring to the top of said coating at which point the setting of the micrometer will indicate the height of said coating.

10. A device for measuring the height of a coating deposited on the surface of a piece of material which comprises, a base, a movable carriage unit mounted on said base, means for clamping a piece of coated material on said carriage unit, a micrometer positioned above said carriage unit and piece of material, and a stylus impregnated with a colored dye fastened to the tip of said micrometer, said carriage and material being horizontally movable with at least a portion of said coating positioned under said stylus and said micrometer being adjustable to move said stylus toward said material and into non-destructive contact with said coated portion whereupon contact of the coating with colored dye from the stylus may be observed and a measurement of the height of the coating read from the micrometer.

References Cited in the file of this patent

UNITED STATES PATENTS

| 2,777,824 | Leeds | Jan. 15, 1957 |
| 3,017,829 | Brown | Jan. 23, 1962 |

FOREIGN PATENTS

| 11,254 | Great Britain | 1905 |